United States Patent
Kim et al.

(10) Patent No.: US 9,721,540 B2
(45) Date of Patent: Aug. 1, 2017

(54) DISPLAY DEVICE HAVING SCOPE OF ACCREDITATION IN COOPERATION WITH DEPTH OF VIRTUAL OBJECT AND CONTROLLING METHOD THEREOF

(71) Applicant: LG ELECTRONICS INC., Seoul (KR)

(72) Inventors: Jihwan Kim, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 343 days.

(21) Appl. No.: 14/473,758

(22) Filed: Aug. 29, 2014

(65) Prior Publication Data

US 2016/0012631 A1    Jan. 14, 2016

(30) Foreign Application Priority Data

Jul. 9, 2014 (KR) .................. 10-2014-0085931

(51) Int. Cl.
| | |
|---|---|
| *G06T 15/20* | (2011.01) |
| *G06T 19/00* | (2011.01) |
| *G06T 19/20* | (2011.01) |
| *G09G 5/38* | (2006.01) |
| *G09G 5/00* | (2006.01) |

(52) U.S. Cl.
CPC .............. *G09G 5/38* (2013.01); *G06T 19/006* (2013.01); *G09G 5/005* (2013.01); *G09G 2340/0442* (2013.01)

(58) Field of Classification Search
CPC ....... G06T 15/20; G06T 19/006; G06T 19/20; G09G 5/005; G09G 5/38; G09G 2340/0442
See application file for complete search history.

(56) References Cited

U.S. PATENT DOCUMENTS

| | | | |
|---|---|---|---|
| 8,223,145 B2 | 7/2012 | Chakraborty | |
| 8,253,746 B2 | 8/2012 | Geisner et al. | |
| 2012/0113223 A1 | 5/2012 | Hilliges et al. | |
| 2012/0212429 A1* | 8/2012 | Okura ................. | G06F 3/04883 345/173 |

(Continued)

FOREIGN PATENT DOCUMENTS

| | | |
|---|---|---|
| JP | 2005-301668 A | 10/2005 |
| JP | 2010-146481 A | 7/2010 |

(Continued)

*Primary Examiner* — Tapas Mazumder
(74) *Attorney, Agent, or Firm* — Birch, Stewart, Kolasch & Birch, LLP

(57) ABSTRACT

A display device having a scope of accreditation in cooperation with a depth of a virtual object and a controlling method thereof are disclosed in this specification. The display device according to this specification outputs a three-dimensional (3D) image including virtual objects. And a scope of accreditation accrediting (or recognizing) that a virtual object has been selected is configured in the virtual object. At this point, an area of a scope of accreditation may be configured to be in cooperation with a depth of a virtual object along an increasing or decreasing direction of the depth of the virtual object, wherein the depth of the virtual object indicates a distance level between the virtual object and a user's perspective within the 3D image.

18 Claims, 13 Drawing Sheets

(56) References Cited

U.S. PATENT DOCUMENTS

2012/0242660 A1* 9/2012 Kim .................. G06T 19/20
345/419
2012/0269384 A1* 10/2012 Jones ................ G06K 9/00201
382/103

FOREIGN PATENT DOCUMENTS

JP         2011-187086 A    9/2011
JP          2013-16060 A    1/2013

* cited by examiner

FIG. 1
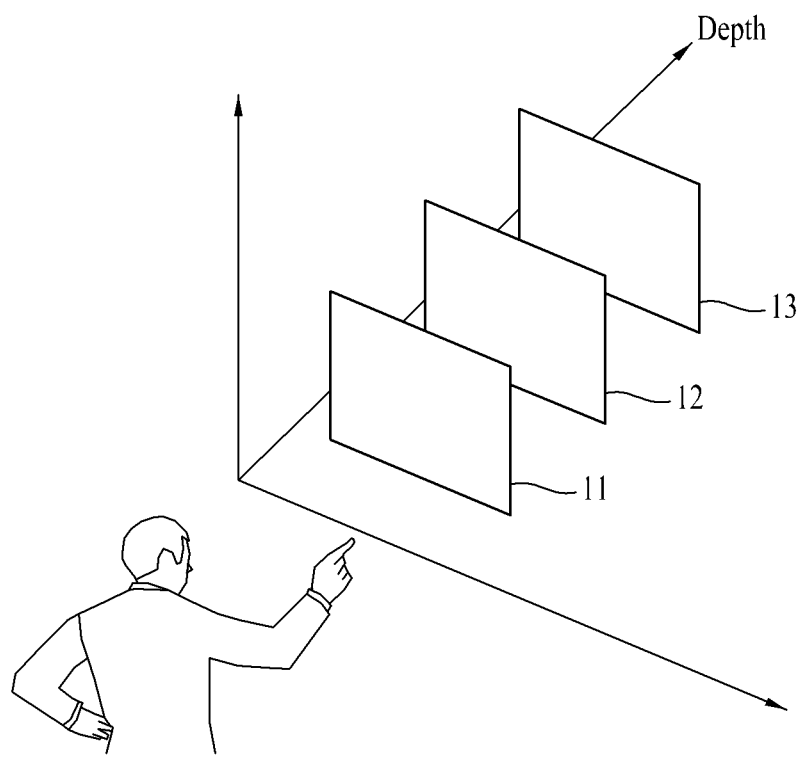
(a)
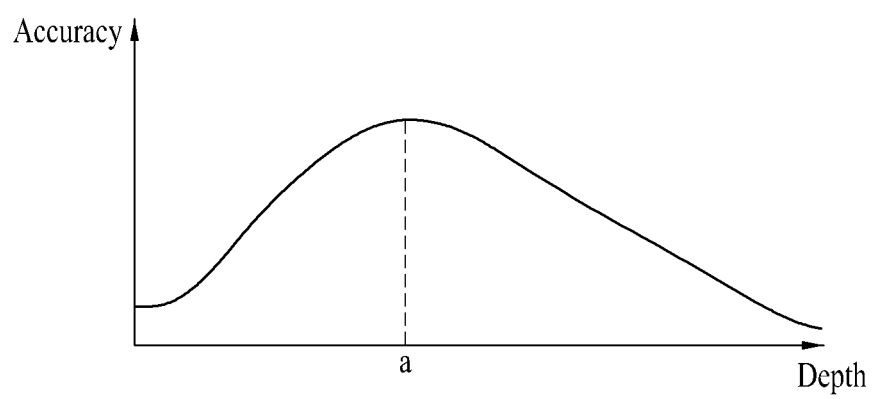
(b)

FIG. 8
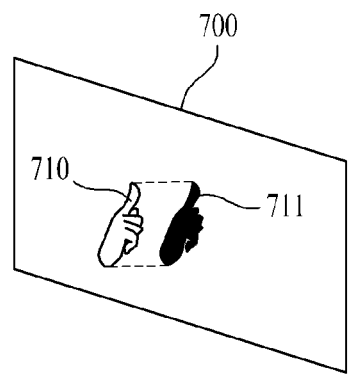
(a)
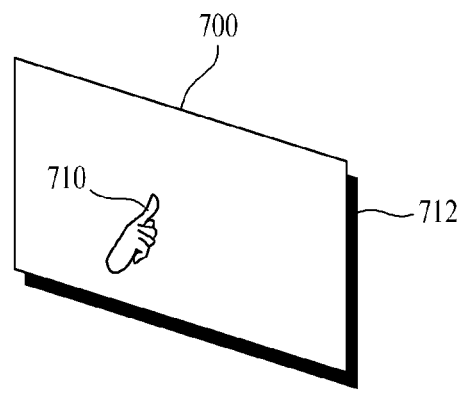
(b)
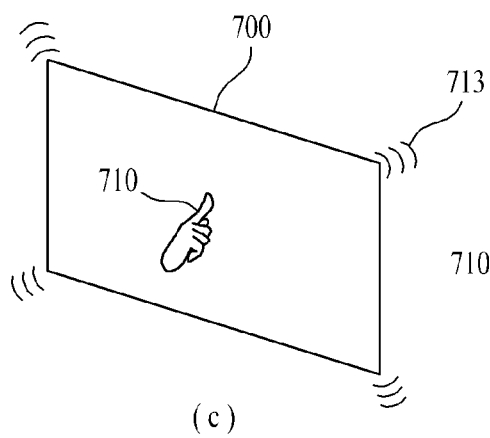
(c)
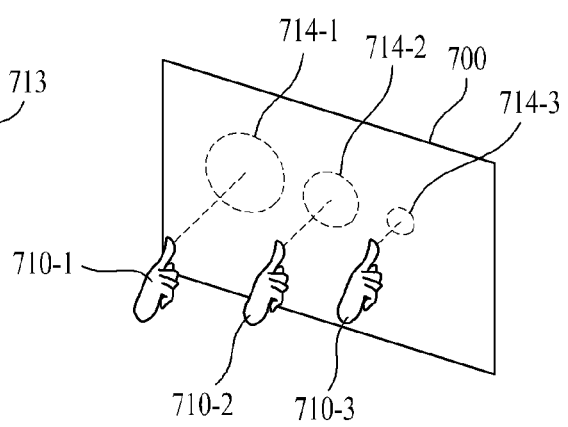
(d)

FIG. 9
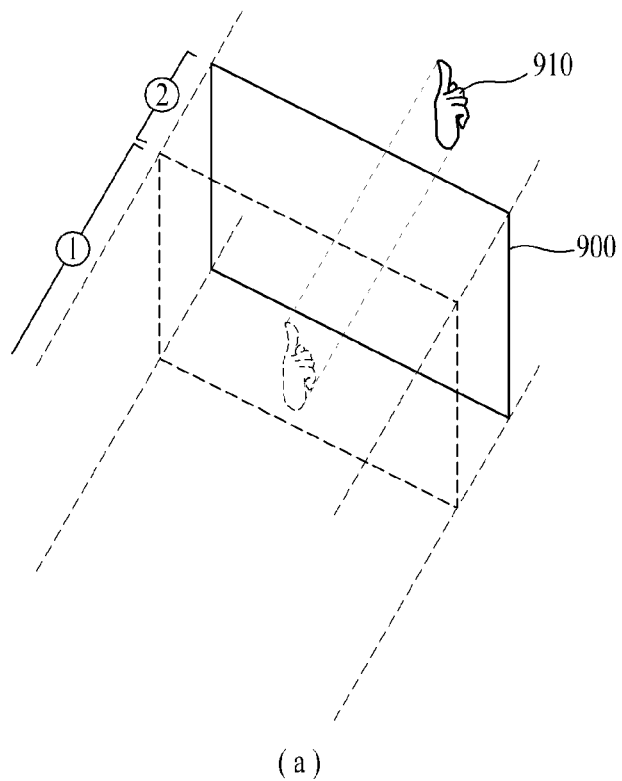
(a)
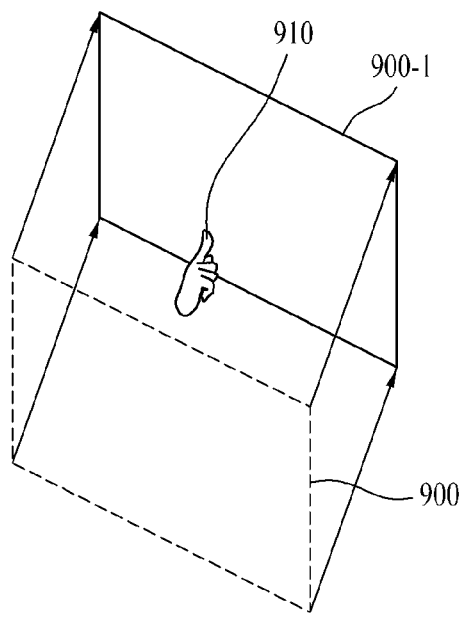
(b)

DISPLAY DEVICE HAVING SCOPE OF ACCREDITATION IN COOPERATION WITH DEPTH OF VIRTUAL OBJECT AND CONTROLLING METHOD THEREOF

Pursuant to 35 U.S.C. §119(a), this application claims the benefit of the Korean Patent Application No. 10-2014-0085931, filed on Jul. 9, 2014, which is hereby incorporated by reference as if fully set forth herein.

BACKGROUND OF THE INVENTION

Field of the Invention

This specification relates to a display device that outputs a three-dimensional (3D) image including a virtual object and a controlling method thereof.

Discussion of the Related Art

The augmented reality (AR) technology, which corresponds to a combination of a real object and a virtual object, allows a user to view a virtual image along with a real image, so as to provide the user with a sense of reality and supplemental information at the same time. For example, when the user's surroundings are seen through a camera, which is equipped in a smart phone, the real image of the user's surroundings is displayed along with an augmented reality image, such as a location, a telephone number, and so on, of a shop (or store) located near-by, in the form of a stereoscopic image (or three-dimensional (3D) image). The augmented reality technology may be applied to a wearable computing device (or a wearable display device). Most particularly, a display that is worn on the head, such as a head mounted display, displays an environment that is actually seen (or viewed) by the user, wherein the displayed environment is being overlapped in real-time with a virtual image or text, and so on, thereby providing the user with an augmented reality.

The augmented reality image also provides a virtual object, which is provided through a 3D image. The virtual object being provided through the 3D image has a depth within the augmented reality image. Herein, a depth has an axis along a direction moving further away based upon the perspective of the user.

The user may select a virtual object through an input object, such as the user's finger, from an augmented reality image. However, a distance of a virtual object recognized and view through the user's perspective, i.e., a depth of the virtual object is merely an illusion caused by binocular parallax of the user and does not correspond to an object actual object located at a specific distance. And, therefore, an error may occur between a distance of a virtual object that is recognized by the user and a depth at which the virtual object is located.

FIG. 1 illustrates a reference diagram showing selection accuracy respective to a depth of a virtual object in a 3D image.

Referring to (a) of FIG. 1, arbitrary virtual objects 11, 12, and 13 are shown in a three-dimensional (3D) image. A depth of a virtual object, which indicates a distance level from which the corresponding virtual object is spaced apart from the user's perspective (or eye-gaze), exists in the 3D image. The depth becomes smaller as the virtual object comes near the user's perspective, and the depth becomes larger as the virtual object is placed further away from the user's perspective. Therefore, it will be understood that the virtual object assigned with reference numeral 11 has the smallest depth. And, it will also be understood that the virtual object assigned with reference numeral 13 has the largest depth, and the virtual object assigned with reference numeral 12 has the middle-level depth.

Referring to (b) of FIG. 1, an accuracy respective to the depth corresponding to when the user has selected a virtual object is illustrated. As shown in the drawing, as the depth is smaller based upon a specific depth 'a', and as the depth is larger based upon a specific depth 'a', the level of accuracy becomes lower. The specific depth 'a' corresponds to a location point where a distance of the virtual object, which is recognized by the user due to the binocular parallax, coincides with an actual depth at which the virtual object is located within the 3D image. The specific depth 'a' is generally close to a point that is reached by a tip of the user's hand, when the user naturally stretches out his (or her) hand.

In order to overcome such errors, a method for displaying a guide image configure to help selecting an object existing within the same plane in a virtual image is disclosed in the published U.S. Patent Application No. US 2010/025352. However, the method disclosed in the above-mentioned related art document, a guide image refers to the provision of another virtual object, and, by providing the user with an excessive number of virtual objects, a complicated image may be displayed to the user. Therefore, a method for resolving such problems is needed.

SUMMARY OF THE INVENTION

Accordingly, this specification is directed to a display device having a scope of accreditation in cooperation with a depth of a virtual object and a controlling method thereof that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a processor configured to control operations of the display device, a display unit configured to output a three-dimensional (3D) image including one or more virtual objects based on a command from the processor, and a sensor unit configured to sense a position of an input object selecting one or more virtual object and to deliver information of the sensed result to the processor. Herein, the processor may determine that a virtual object has been selected, when a position of the input object is located within a scope accreditation, the scope of accreditation being a scope accrediting that the virtual object has been selected, and an area of the scope of accreditation may be configured to be in cooperation with a depth of the virtual object along an increasing or decreasing direction of the depth of the virtual object, wherein the depth of the virtual object indicates a distance level between the virtual object and a user's perspective within the 3D image.

According to an exemplary embodiment of this specification, an area of the scope of accreditation may become larger as a size of depth of the virtual object becomes smaller.

According to another exemplary embodiment of this specification, an area of the scope of accreditation may become larger as a size of depth of the virtual object becomes larger.

According to yet another exemplary embodiment of this specification, an area of the scope of accreditation may become larger, when a depth of the virtual object is smaller than a reference depth, and an area of the scope of accreditation may become larger, when a depth of the virtual object is larger than a reference depth.

According to this specification, the scope of accreditation may include a first scope of accreditation located along a decreasing direction of a depth with respect to the virtual object, and a second scope of accreditation located along an increasing direction of a depth with respect to the virtual object. And, at this point, the first scope of accreditation and the second scope of accreditation may be configured to be in cooperation with a depth of the virtual object.

According to an exemplary embodiment of this specification, an area of the second scope of accreditation may be larger than an area of the first scope of accreditation, as a size of depth of the virtual object becomes smaller.

According to another exemplary embodiment of this specification, an area of the second scope of accreditation may be larger than an area of the first scope of accreditation, as a size of depth of the virtual object becomes larger.

According to yet another exemplary embodiment of this specification, an area of the second scope of accreditation may be larger than an area of the first scope of accreditation, when a size of depth of the virtual object is smaller than a reference depth, and an area of the first scope of accreditation may be larger than an area of the second scope of accreditation, when a size of depth of the virtual object is larger than a reference depth.

In this specification, the reference depth may be configured to have a consistent range.

In this specification, the reference depth may be predetermined.

In this specification, the reference depth may be configured by the user. At this point, the processor may provide an interface for configuring the reference depth to the display unit.

According to an exemplary embodiment of this specification, the processor may calculate an input object movement speed from position information of the input object, wherein the position information of the input object is received from the sensor unit.

According to another exemplary embodiment of this specification, the processor may perform control operations for displaying a guide interface related to the virtual object, when a position of the input object is near the virtual object, and when the calculated input object movement speed is lower than a predetermined reference speed. At this point, the guide interface may correspond to one of to a shadow of an input object, a shadow of a virtual object, a bouncing movement of a virtual object, and a display of a proximity level between an input object and a virtual object.

According to an exemplary embodiment of this specification, the processor may relocate a position of the virtual object so as to provide a larger depth to the virtual object as compared to a position of the input object, when the position of the input object is near the virtual object, and when the calculated input object movement speed is higher than a predetermined reference speed.

According to another exemplary embodiment of this specification, the scope of accreditation may include a first scope of accreditation located along a decreasing direction of a depth with respect to the virtual object, and a second scope of accreditation located along an increasing direction of a depth with respect to the virtual object. And, herein, the processor may increase an area of the second scope of accreditation, when the position of the input object is near the virtual object, and when the calculated input object movement speed is higher than a predetermined reference speed.

According to this specification, the scope of accreditation may be configured to be in cooperation with a depth of the virtual object and a size of the virtual object. And, according to an exemplary embodiment, an area of the scope of accreditation may become larger as a size of the virtual object becomes smaller than a predetermined reference size of the virtual object.

In order to achieve another technical object of this specification, a method for controlling a display device includes the steps of (a) configuring an area of a scope of accreditation to be in cooperation with a depth of a virtual object along an increasing or decreasing direction of the depth of the virtual object, wherein the depth of the virtual object indicates a distance level between the virtual object and a user's perspective within the 3D image, (b) receiving information related to a position of the input object from a sensor unit, and (c) determining that a virtual object has been selected, when a position of the input object is located within a scope accrediting that the virtual object has been selected (hereinafter referred to as a 'scope of accreditation').

It is to be understood that both the foregoing general description and the following detailed description of this specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a reference diagram showing selection accuracy respective to a depth of a virtual object in a 3D image;

FIG. 8 illustrates a reference diagram of a guide interface according to an exemplary embodiment of this specification;

FIG. 9 illustrates an example of displaying a guide interface, when the movement speed of an input object is high when located near a virtual object;

DETAILED DESCRIPTION OF THE INVENTION

Figure 2:
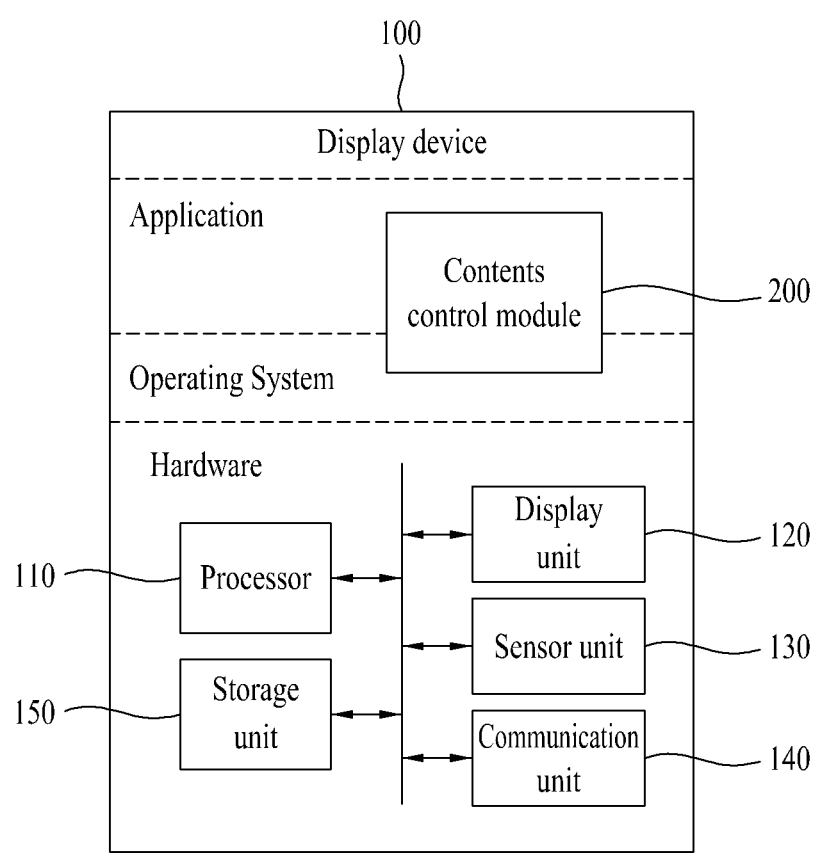
FIG. 2 illustrates a block diagram showing a general structure of a display device according to an exemplary embodiment of this specification.

Hereinafter, preferred exemplary embodiments of this specification that can best carry out the above-described objects of this specification will be described in detail with reference to the accompanying drawings. At this point, the structure or configuration and operations of this specification, which are illustrated in the drawings and described with respect to the drawings, will be provided in accordance with at least one exemplary embodiment of this specification. And, it will be apparent that the technical scope and spirit of this specification and the essential structure and operations of this specification will not be limited only to the exemplary embodiments set forth herein.

In addition, although the terms used in this specification are selected from generally known and used terms, the terms used herein may be varied or modified in accordance with the intentions or practice of anyone skilled in the art, or along with the advent of a new technology. Alternatively, in some particular cases, some of the terms mentioned in the description of this specification may be selected by the applicant at his or her discretion, the detailed meanings of which are described in relevant parts of the description herein. Furthermore, it is required that this specification is understood, not simply by the actual terms used but by the meaning of each term lying within.

Specific structural and functional description of this specification respective to the exemplary embodiments, which are provided in accordance with the concept of this specification disclosed in the description of this specification, is merely an exemplary description provided for the purpose of describing the exemplary embodiments according to the concept of this specification. And, therefore, the exemplary embodiment of this specification may be realized in diverse forms and structures, and, it should be understood that this specification is not to be interpreted as being limited only to the exemplary embodiments of this specification, which are described herein.

Since diverse variations and modifications may be applied to the exemplary embodiments according to the concept of this specification, and, since the exemplary embodiments of this specification may be configured in diverse forms, specific embodiment of this specification will hereinafter be described in detail with reference to the examples presented in the accompanying drawings. However, it should be understood that the exemplary embodiments respective to the concept of this specification will not be limited only to the specific structures disclosed herein. And, therefore, it should be understood that all variations and modifications, equivalents, and replacements, which are included in the technical scope and spirit of this specification, are included.

FIG. 2 illustrates a block diagram showing a general structure of a display device 100 according to an exemplary embodiment of this specification.

Referring to FIG. 2, the display device 100 according to this specification may include a hardware layer, an operating system (OS) layer, and an application layer. However, FIG. 2 merely corresponds to an exemplary structure. And, therefore, some of the elements may be deleted or a new configuration module may be added whenever required by anyone skilled in the art.

The hardware layer of the display device 100 may include a display unit 120 and a sensor unit 130. Additionally, the hardware layer of the display device 100 may further include a communication unit 140 and a storage unit 150.

The processor 110 may control the operations of the display device 100. In order to control the operation of the display device 100, the processor 110 may execute contents stored in the storage unit 150 or contents received via data communication. Additionally, the processor 110 may execute diverse applications and may process data existing inside the display device 100. Moreover, the processor 110 operates a contents control module 200, and the processor 110 may control the contents of the display device 100 based on a control commands from the contents control module 200. Furthermore, the processor 110 may control each units included in the above-described display device 100, and the processor 110 may also control data transmission/reception (or transception) between the units.

The display unit 120 may output images on a display screen. The display unit 120 may output an image based upon contents being executed by the processor 110 or based on a control command from the processor 110. In this specification, the display unit 120 may output a 3D image including one or more virtual objects based on a command from the processor 110. The 3D image may correspond to a scene (or display image) consisting of a combination of a virtual image and a virtual object, or the 3D image may correspond to an augmented reality scene (or augmented reality display image) consisting of a combination of a real object and a virtual object.

The virtual object included in the 3D image, which is outputted by the display unit 120, has a depth related to a position (or location) of the virtual object within the respective 3D image. Herein, the depth refers to a level of distance between the virtual object within the 3D image and the perspective (or eyes) of the user. Accordingly, the depth has an axis along a direction parallel to the user's perspective. In this specification, it will be described that the depth becomes smaller as the virtual object is positioned closer to the user, and that the depth becomes larger as the virtual object is positioned further away from the user. Since the depth has already been described above within reference to (a) of FIG. 1, detailed description of the same will be omitted for simplicity.

The sensor unit 130 senses a position of an input object, which selects the virtual object, and the sensor unit 130 may deliver information on the sensed result to the processor 110. Herein, the input object corresponds to a tool (or instrument) that is used when the user selects a specific virtual object from the 3D image, which is outputted from the display unit 120. The input object may correspond to the user's finger, a pen, a pointer image that is provided in the 3D image, and so on. At this point, the sensor unit 130 may include at least one sensing means.

According to an exemplary embodiment of this specification, the at least one sensing means may include a gravity sensor, a geomagnetic (or terrestrial magnetism) sensor, a motion sensor, a gyro sensor, an acceleration sensor, an infrared sensor, an inclination sensor, a brightness sensor, an altitude sensor, an odor sensor, a temperature sensor (or thermal sensor), a depth sensor, a pressure sensor, a banding sensor, an audio sensor, a video sensor, a Global Positioning System (GPS) sensor, a touch sensor, a fingerprint sensor, and so on. The sensor unit 130 collectively refers to the above-described sensing means, and the sensor unit 130 senses diverse inputs inputted by the user and the user's environment, and, then, the sensor unit 130 delivers the sensed result to the processor 110, so that the processor 110 can perform operations in accordance with the received sensed result. The above-described sensors may each be included in the display device 100 as a separate element, or at least one or more sensors may be combined (or integrated), so as to be included in the display device 100 as at least one or more elements.

Meanwhile, the communication unit 140 may transmit/receive data by communicating with an external device or server using diverse protocols. In this specification, the communication unit 140 may access a server or cloud through the network and may, then, transmit/receive digital data, e.g., content. In this specification, the communication unit 140 may be optionally equipped in the display device 100.

Additionally, the storage unit 150 of this specification may store diverse digital data, such as video data, audio data, pictures, documents, applications, and so on. The storage unit 150 corresponds to a disclosed semiconductor device, such as a flash memory, a Random Access Memory (RAM), a Read Only Memory (ROM), an Electrically Erasable Programmable Read Only Memory (EEPROM), a Solid State Drive (SDD), and so on, which is known to be capable of writing (or recording) and erasing data, or a high capacity storage medium, such as a hard disk drive, and the storage unit 150 collectively refers to a device storing information therein regardless of the device type. And, therefore, the storage unit 150 does not refer to a specific memory device. In this specification, the storage unit 150 may store diverse types of contents. Additionally, the storage unit 150 may store contents that are received by the communication unit 140 from an external device or a server.

In this specification, when a position of the input object is located within a scope accrediting (or recognizing) that the virtual object has been selected (hereinafter referred to as a 'scope of accreditation'), the processor 110 may determine that the corresponding virtual object has been selected.

Figure 3:
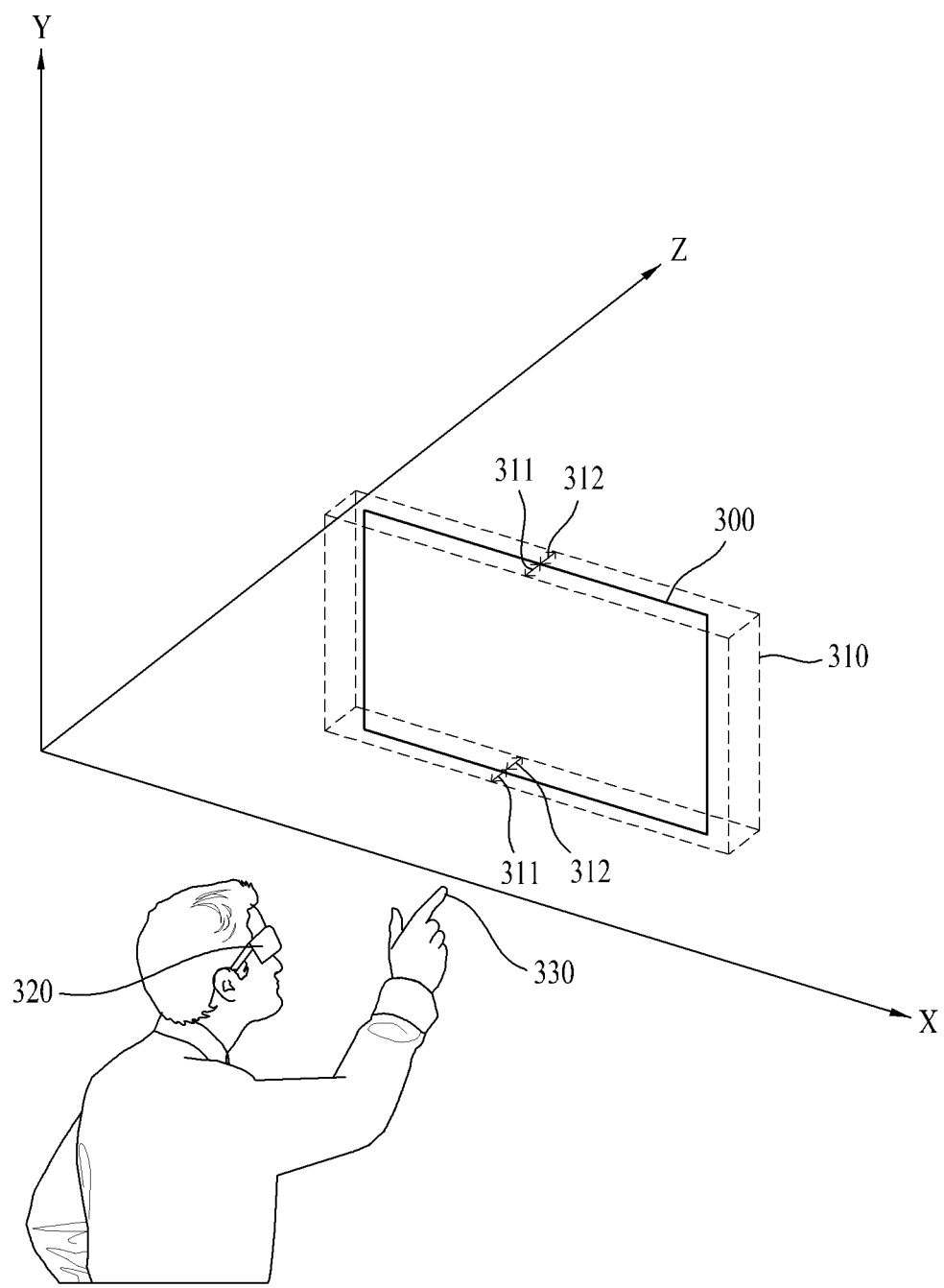
FIG. 3 illustrates a reference diagram showing a selection of a virtual object and a scope of accreditation of the virtual object.

FIG. 3 illustrates a reference diagram showing a selection of a virtual object and a scope of accreditation of the virtual object.

Referring to FIG. 3, a 3D image including a virtual object 300, which can be seen by a user wearing a Head Mount Display (HMD) 320, is shown. In the drawing, the HMD 320 is merely an example of the display device 100 according to this specification, and, therefore, it will not limit this specification.

Additionally, as shown in FIG. 3, an X-axis, a Y-axis, and a Z-axis are illustrated along with the virtual object 300. The X-axis, the Y-axis, and the Z-axis correspond to reference images illustrated in this specification in order to describe the direction of the user's perspective (or eye-gaze) and the depth. Accordingly, the X-axis, the Y-axis, and the Z-axis may not be included in the 3D image that is displayed to the user. The X-axis indicates a horizontal direction with respect to the user's perspective. The Y-axis indicates a vertical direction with respect to the user's perspective. And, the Z-axis indicates a same direction as the user's perspective. Accordingly, in this specification, the Z-axis and the depth indicate the same direction. Moreover, in this specification, an increasing or decreasing direction of the depth may signify the same direction as the Z-axis. Therefore, the size of depth becomes larger as the virtual object is placed further away from the user along the Z-axis, and the size of depth becomes smaller as the virtual object is placed closer to the user along the Z-axis.

A scope 310 accrediting (or recognizing) that the virtual object has been selected (hereinafter referred to as a 'scope of accreditation') may be configured for each virtual object 300. In FIG. 3, since only one virtual object 300 is illustrated, one scope of accreditation 310 is configured. In the exemplary embodiment shown in FIG. 3, the scope of accreditation 310 is illustrated to occupy a larger area than the virtual object 300. However, this specification will not be limited only to the exemplary embodiment shown in FIG. 3, and, therefore, the area of the scope of accreditation 310 may be diversely configured.

When the user intends to select a specific virtual object from the 3D image, the user may select the specific virtual object by using the input object 330. The exemplary embodiment shown in FIG. 3 corresponds to an exemplary embodiment wherein the input object 330 is the user's finger. However, this specification will not be limited only to the exemplary embodiment shown in FIG. 3. As described above, the sensor unit 130 senses a position of the input object 330 selecting the virtual object 300. At this point, the sensor unit 130 may include at least one sensing means that can sense the position of the input object 330. The sensor unit 130 may deliver information on the sensed result to the processor 110. When it is determined that the input object 330 is positioned within the scope of accreditation 310, the processor 110 determines that the virtual object 300 has been selected.

According to this specification, the scope of accreditation may be configured to be in cooperation with a depth of the virtual object along an increasing direction of decreasing direction of the virtual object.

According to the exemplary embodiment of this specification, as the size of a depth at which the virtual object is located becomes smaller, the area of the scope of accreditation may become larger.

Figure 4:
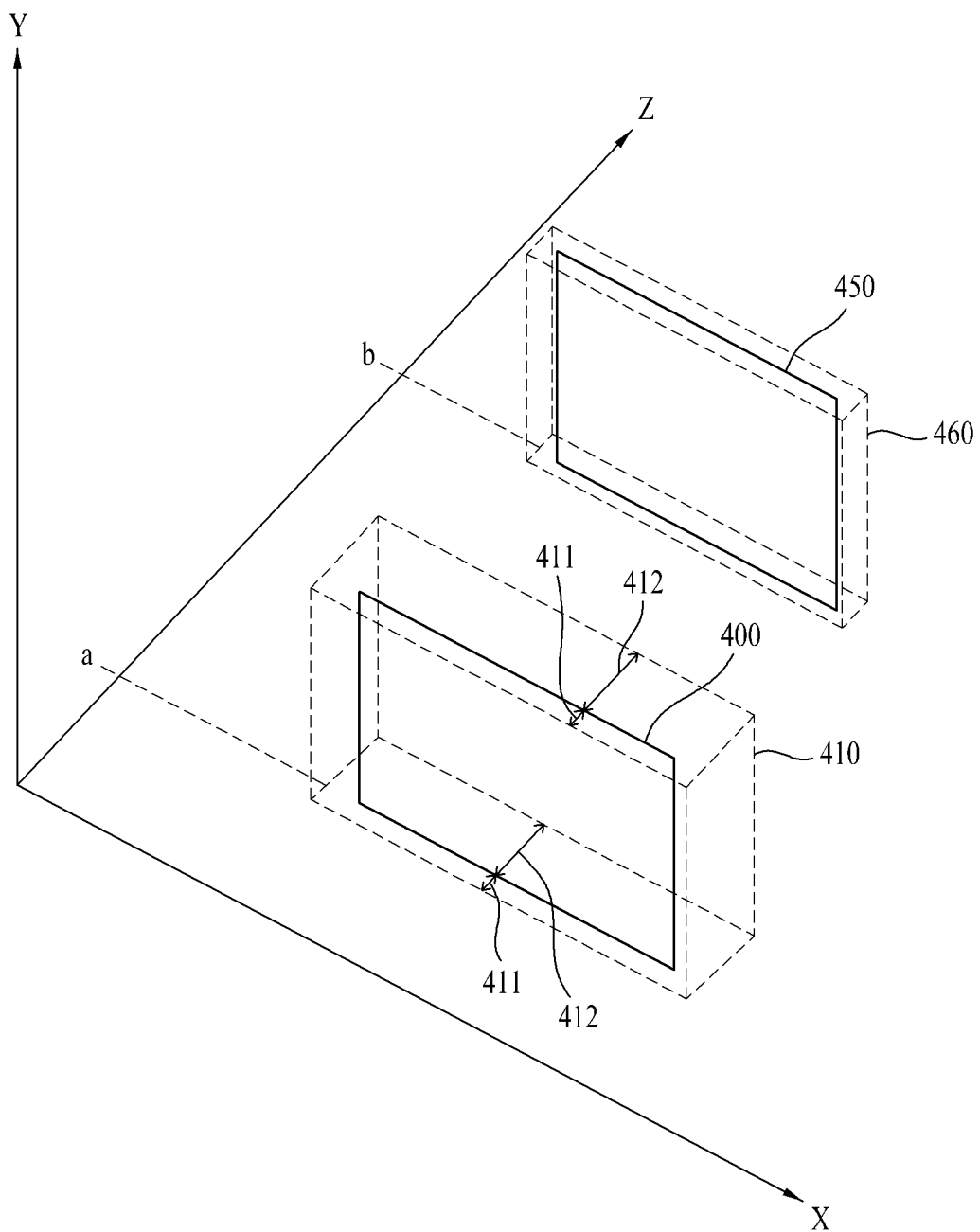
FIG. 4 illustrates a reference diagram showing an exemplary embodiment, wherein the area of the scope of accreditation becomes larger as the size of the depth at which the virtual object is located becomes smaller.

FIG. 4 illustrates a reference diagram showing an exemplary embodiment, wherein the area of the scope of accreditation becomes larger as the size of the depth at which the virtual object is located becomes smaller.

Referring to FIG. 4, two virtual objects 400 and 450 each having a different depth are illustrated. The virtual object given the reference numeral 400 has a depth 'a', and the virtual object given the reference numeral 450 has a depth 'b'. At this point, 'a' corresponds to a smaller depth as compared to 'b'. Therefore, according to the exemplary embodiment of this specification, it will be apparent that the scope of accreditation 410 of the virtual object 400 having a relatively smaller depth 'a' is larger than the scope of accreditation 460 of the virtual object 450 having a relatively larger depth 'b'. In this exemplary embodiment, the difference between the depth of a virtual object recognized by the user and the depth where the virtual object is actually located becomes larger as the virtual object is located closer to the user, i.e., as the depth is smaller. Therefore, according to this exemplary embodiment, when the user selects a virtual object having a small depth, a possibility (or likelihood) of an error occurring becomes smaller.

According to another exemplary embodiment of this specification, as the size of a depth at which the virtual object is located becomes larger, the area of the scope of accreditation may also become larger.

Figure 5:
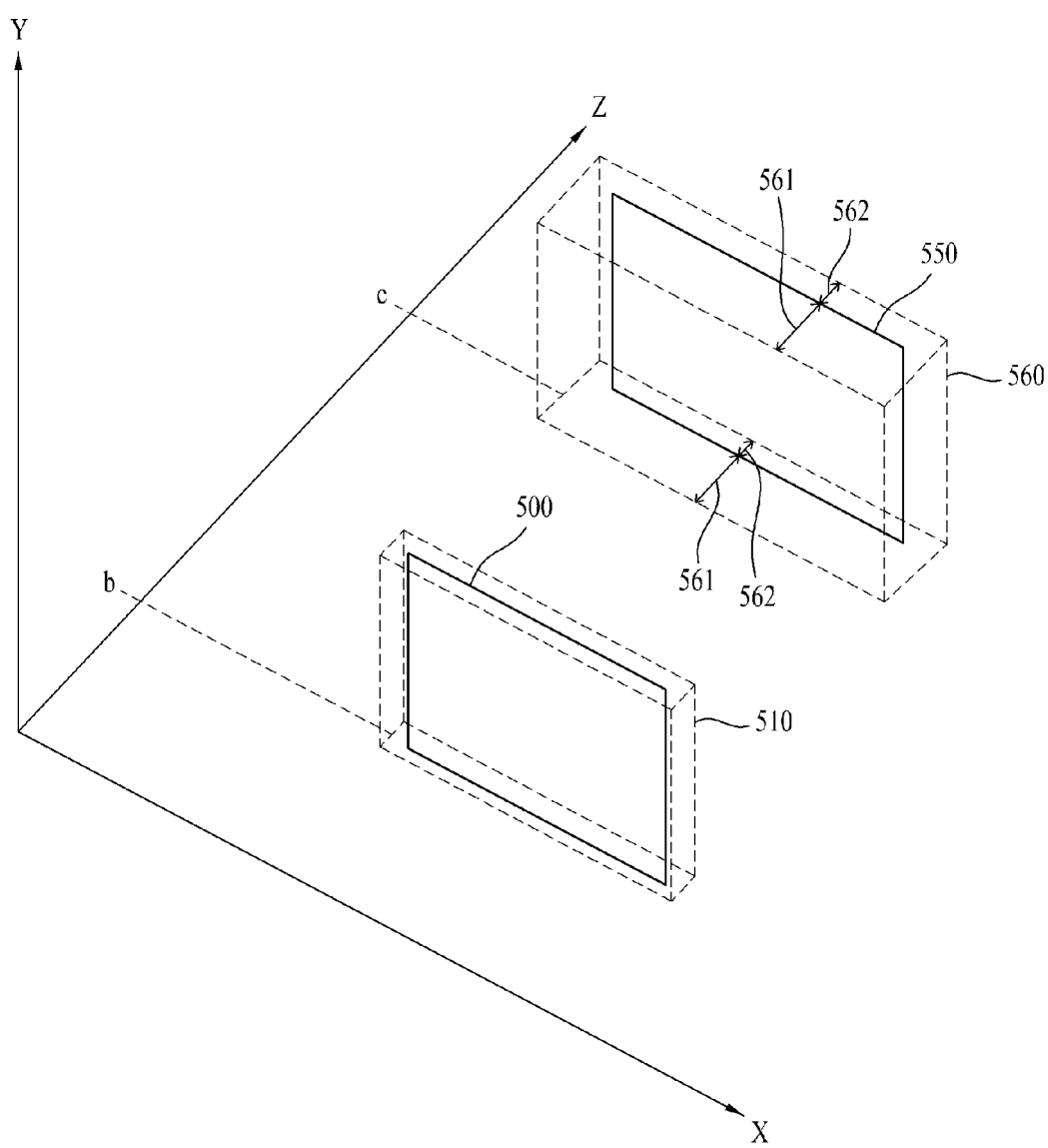
FIG. 5 illustrates a reference diagram showing an exemplary embodiment, wherein the area of the scope of accreditation becomes larger as the size of the depth at which the virtual object is located becomes larger.

FIG. 5 illustrates a reference diagram showing an exemplary embodiment, wherein the area of the scope of accreditation becomes larger as the size of the depth at which the virtual object is located becomes larger.

Referring to FIG. 5, two virtual objects 500 and 550 each having a different depth are illustrated. The virtual object given the reference numeral 500 has a depth 'b', and the virtual object given the reference numeral 550 has a depth 'c'. At this point, 'c' corresponds to a larger depth as compared to 'b'. Therefore, according to the other exemplary embodiment of this specification, it will be apparent that the scope of accreditation 560 of the virtual object 550 having a relatively larger depth 'c' is larger than the scope of accreditation 510 of the virtual object 500 having a relatively smaller depth 'b'. In this exemplary embodiment, the difference between the depth of a virtual object recognized by the user and the depth where the virtual object is actually located becomes larger as the virtual object is located further away from the user, i.e., as the depth is larger. Therefore, according to this exemplary embodiment, when the user selects a virtual object having a large depth, a possibility (or likelihood) of an error occurring becomes smaller.

According to yet another exemplary embodiment of this specification, if a depth at which the virtual object is located is smaller than a reference depth, the area of the scope of accreditation may become larger, and, if a depth at which the virtual object is located is larger than a reference depth, the area of the scope of accreditation may also become larger.

Figure 6:
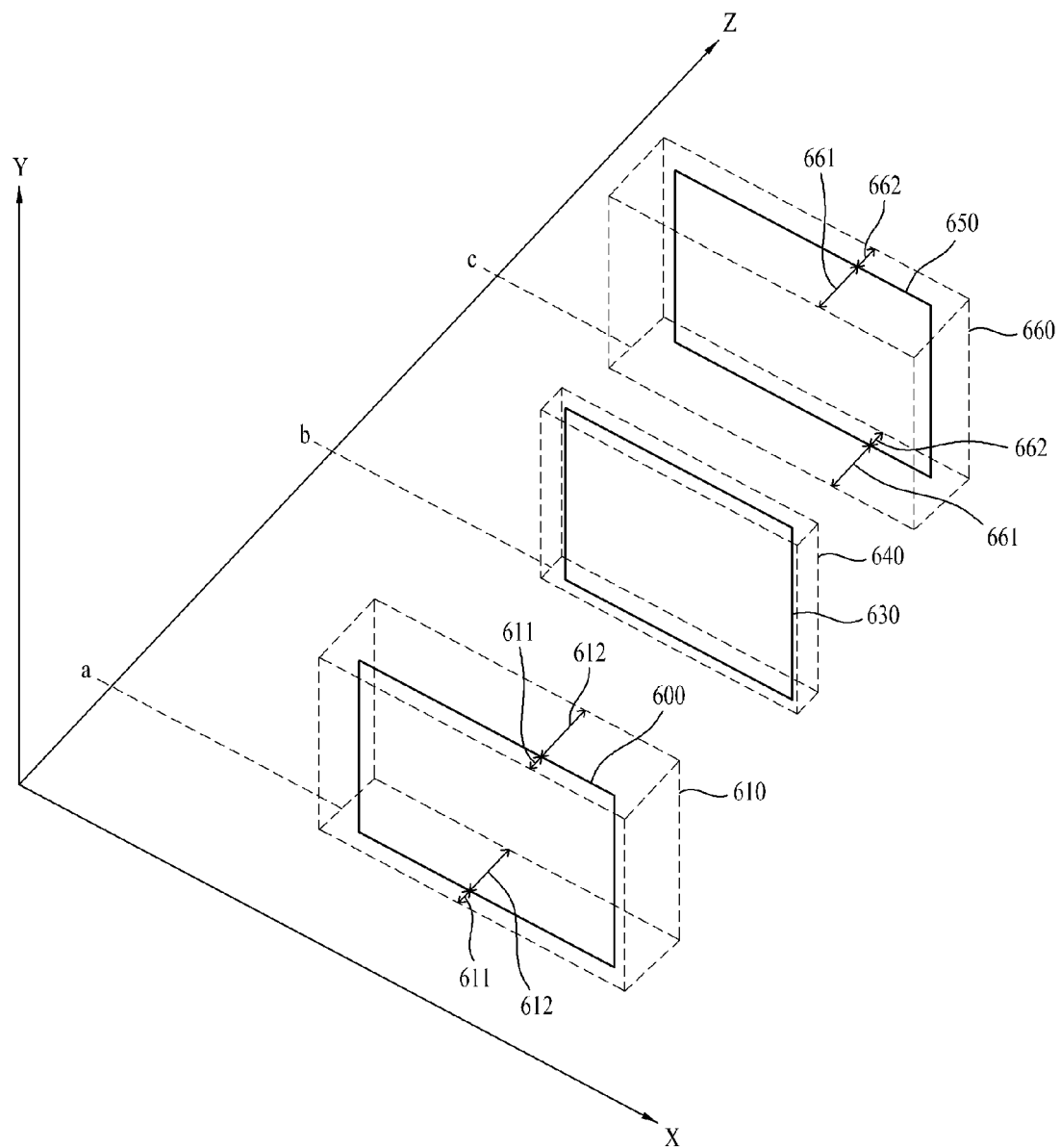
FIG. 6 illustrates a reference diagram showing an exemplary embodiment, wherein the area of the scope of accreditation becomes larger when a depth at which the virtual object is located is smaller or larger than a reference depth.

FIG. 6 illustrates a reference diagram showing an exemplary embodiment, wherein the area of the scope of accreditation becomes larger when a depth at which the virtual object is located is smaller or larger than a reference depth.

Referring to FIG. 6, three virtual objects 600, 630, and 650 each having a different depth are illustrated. The virtual object given the reference numeral 600 has a depth 'a', the virtual object given the reference numeral 630 has a depth 'b', and the virtual object given the reference numeral 650 has a depth 'c'. At this point, 'a' corresponds to the smallest depth, 'b' corresponds to a middle depth, and 'c' corresponds to a largest depth. And, in this exemplary embodiment, the depth 'b' corresponds to the reference depth.

Therefore, according to the other exemplary embodiment of this specification, it will be apparent that the scope of accreditation 610 of the virtual object 600 having depth 'a', which is smaller than the reference depth 'b', is larger than the scope of accreditation 640 of the virtual object 630 having the reference depth 'b'. And, at the same time, according to the other exemplary embodiment of this specification, it will also be apparent that the scope of accreditation 660 of the virtual object 650 having depth 'c', which is larger than the reference depth 'b', is also larger than the scope of accreditation 640 of the virtual object 630 having the reference depth 'b'.

The reference depth may be diversely configured. Preferably, the reference depth corresponds to a time point at which a depth of a virtual object recognized by the user as a result of binocular parallax coincides with an actual depth where the virtual object is located within a corresponding 3D image. For example, when a user naturally stretches out his (or her) hand, the reference depth may be approximate to a point where a tip of the user's hand reaches. However, this example will not limit this specification.

The reference depth according to this specification may be configured to have a predetermined range. In FIG. 6, for simplicity in the drawing, the reference depth has been illustrated as a point (b). However, exemplary illustration of the reference depth will not be limited only to this. In this case, a predetermined range of the reference depth may be stored in the storage unit 150.

According to an exemplary embodiment of this specification, the reference depth may be configured in advanced (or pre-configured). In this case, the configuration details may be stored in advance in the storage unit 150.

According to another exemplary embodiment, the reference depth may be configured by the user. The user may configure a reference depth that best fits the user himself (or herself) based upon the user's eyesight, the user's focus, the size of the input object, and so on. In this case, the processor 110 may provide an interface for configuring the reference depth to the display unit 120. Thereafter, the configuration details may be stored in the storage unit 150.

Meanwhile, the scope of accreditation includes a first scope of accreditation and a second scope of accreditation. The first scope of accreditation is located along a decreasing direction of the depth with respect to the virtual object. And, the second scope of accreditation is located along an increasing direction of the depth with respect to the virtual object.

According to the exemplary embodiment of this specification, when configuring the scope of accreditation, the first scope of accreditation and the second scope of accreditation may be configured to be in cooperation with the depth where the virtual object is located.

According to an exemplary embodiment of this specification, as the size of the depth where the virtual object is located becomes smaller, an area of the second scope of accreditation may be larger than an area of the first scope of accreditation.

Referring back to FIG. 4, the scope of accreditation 410 of the virtual object 400, which is located in the relatively small depth 'a' will be further described in detail. The scope of accreditation 410 includes a first scope of accreditation 411, which is located along a decreasing direction with respect to the virtual object 400. And, the scope of accreditation 410 also includes a second scope of accreditation 412, which is located along an increasing direction with respect to the virtual object 400. At this point, according to the exemplary embodiment of this specification, it will be apparent that a thickness of the second scope of accreditation 412 is greater than a thickness of the first scope of accreditation 411. This exemplary embodiment corresponds to a case when it is considered that, as a depth where the virtual object is actually located becomes smaller, the user may be under an illusion that he (or she) has a depth that is greater than an actual depth where the virtual object is located. More specifically, when the user intends to select a virtual object having a small depth, the exemplary embodiment shown in FIG. 4 corresponds to a case when the user is more likely to select the second scope of accreditation of the virtual object.

According to another exemplary embodiment of this specification, as the size of the depth where the virtual object is located becomes larger, an area of the first scope of accreditation may be larger than an area of the second scope of accreditation.

Referring back to FIG. 5, the scope of accreditation 560 of the virtual object 550, which is located in the relatively larger depth 'c' will be further described in detail. The scope of accreditation 560 includes a first scope of accreditation 561, which is located along a decreasing direction with respect to the virtual object 550. And, the scope of accreditation 560 also includes a second scope of accreditation 562, which is located along an increasing direction with respect to the virtual object 550. At this point, according to the other exemplary embodiment of this specification, it will be apparent that a thickness of the first scope of accreditation 561 is greater than a thickness of the second scope of accreditation 562. This exemplary embodiment corresponds to a case when it is considered that, as a depth where the virtual object is actually located becomes larger, the user may be under an illusion that he (or she) has a depth that is smaller than an actual depth where the virtual object is located. More specifically, when the user intends to select a virtual object having a large depth, the exemplary embodiment shown in FIG. 5 corresponds to a case when the user is more likely to select the first scope of accreditation of the virtual object.

According to yet another exemplary embodiment of this specification, if the size of the depth where the virtual object is located is smaller than the reference depth, an area of the second scope of accreditation may be larger than an area of the first scope of accreditation, and, if the size of the depth where the virtual object is located is larger than the reference depth, an area of the first scope of accreditation may be larger than an area (or thickness) of the second scope of accreditation.

Referring back to FIG. 6, the scope of accreditation 610 of the virtual object 600 that is located in depth 'a', which is smaller than the reference depth 'b', and the scope of accreditation 660 of the virtual object 650 that is located in depth 'c', which is larger than the reference depth 'b' will be further described in detail.

First of all, the scope of accreditation 610 of the virtual object 600 that is located in depth 'a' includes a first scope of accreditation 611, which is located along a decreasing direction with respect to the virtual object 600. And, the scope of accreditation 610 of the virtual object 600 that is located in depth 'a' also includes a second scope of accreditation 612, which is located along an increasing direction with respect to the virtual object 600. At this point, according to the exemplary embodiment of this specification, it will be apparent that a thickness of the second scope of accreditation 612 is greater than a thickness of the first scope of accreditation 611.

Thereafter, the scope of accreditation 660 of the virtual object 650 that is located in depth 'c' includes a first scope of accreditation 661, which is located along a decreasing direction with respect to the virtual object 650. And, the scope of accreditation 660 of the virtual object 650 that is located in depth 'c' also includes a second scope of accreditation 662, which is located along an increasing direction with respect to the virtual object 650. At this point, according to the exemplary embodiment of this specification, it will be apparent that a thickness of the first scope of accreditation 661 is greater than a thickness of the second scope of accreditation 662.

The reference depth may be diversely configured. Preferably, the reference depth corresponds to a time point at which a depth of a virtual object recognized by the user as a result of binocular parallax coincides with an actual depth where the virtual object is located within a corresponding 3D image. For example, when a user naturally stretches out his (or her) hand, the reference depth may be approximate to a point where a tip of the user's hand reaches. However, this example will not limit this specification.

The reference depth according to this specification may be configured to have a predetermined range. In FIG. 6, for simplicity in the drawing, the reference depth has been illustrated as a point (b). However, exemplary illustration of the reference depth will not be limited only to this. In this case, a predetermined range of the reference depth may be stored in the storage unit 150.

According to an exemplary embodiment of this specification, the reference depth may be configured in advance (or pre-configured). In this case, the configuration details may be stored in advance in the storage unit 150.

According to another exemplary embodiment, the reference depth may be configured by the user. The user may configure a reference depth that best fits the user himself (or herself) based upon the user's eyesight, the user's focus, the size of the input object, and so on. In this case, the processor 110 may provide an interface for configuring the reference depth to the display unit 120. Thereafter, the configuration details may be stored in the storage unit 150.

Meanwhile, the processor 110 may calculate (or compute) a movement speed of the input object (or input object movement speed) from a position information of the input object, which is delivered to the processor 110 from the sensor unit 130.

According to an exemplary embodiment of this specification, when a position of the input object is located near the virtual object, and when the calculated input object movement speed is lower than a predetermined (or pre-configured) reference speed, the processor 110 may perform control operations for displaying a guide interface related to the virtual object.

Figure 7:
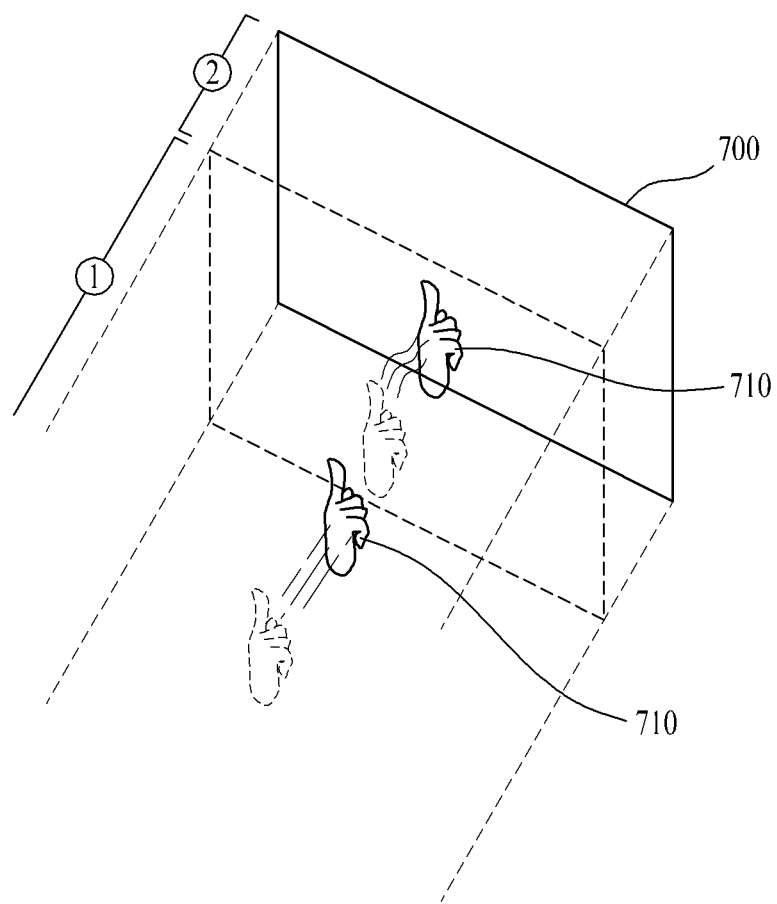
FIG. 7 illustrates a reference diagram for displaying a guide interface, when the movement speed of an input object is low when located near a virtual object.

FIG. 7 illustrates a reference diagram for displaying a guide interface, when the movement speed of an input object is low when located near a virtual object.

Referring to FIG. 7, an input object 710 that is about to select a virtual object 700 is illustrated. As shown in the exemplary embodiment of FIG. 7, the input object 710 corresponds to the user's finger. Meanwhile, in FIG. 7, a section that is not located near the virtual object 700 is indicated as 'Section number 1', and a section that is located near the virtual object 700 is indicated as 'Section number 2'.

The movement of the input object 710 when the user intends to select the virtual object 700 is illustrated in FIG. 7. In Section number 1, which is not located near the virtual object 700, the user will quickly move the input object 710. Conversely, in Section number 2, which is located near the virtual object 700, the user will slowly move the input object 710 for accuracy in his (or her) selection. More specifically, when the user intends to select the virtual object 700, a section that is quickly and directly accessed by the input object 710 and a section that is slowly and carefully accessed by the input object 710 may be identified (or distinguished). When the position of the input object 710 is located near the virtual object 700, and when the calculated input object movement speed is lower than a predetermined (or pre-configured) reference speed, the processor 110 may determine that the user is about to select the virtual object 700. The pre-configured reference speed corresponds to a reference allowing the processor 110 to determine whether the input object moves slowly and carefully when selecting the virtual object. And, depending upon the characteristics of the input object, the reference speed may be diversely configured. When it is determined that the user intends to select the virtual object 700, the processor 110 may perform control operations for displaying a guide interface related to the virtual object 700.

FIG. 8 illustrates a reference diagram of a guide interface according to an exemplary embodiment of this specification.

According to an exemplary embodiment of this specification, the guide interface corresponds to a shadow 711 of the input object. Referring to (a) of FIG. 8, when it is determined that the user intends to select the virtual object 700, the processor 110 may perform control operation for displaying a shadow 711 of the input object 710.

According to another exemplary embodiment of this specification, the guide interface corresponds to a shadow 712 of the virtual object 700. Referring to (b) of FIG. 8, when it is determined that the user intends to select the virtual object 700, the processor 110 may perform control operation for displaying a shadow 712 of the virtual object 700.

According to yet another exemplary embodiment of this specification, the guide interface corresponds to a bounce 713 of the virtual object 700. Referring to (c) of FIG. 8, when it is determined that the user intends to select the virtual object 700 by using the input object 710, the processor 110 may perform control operation for displaying the virtual object 700 to appear to be bouncing.

According to yet another exemplary embodiment of this specification, the guide interface corresponds to a proximity level display 714 between the virtual object and the input object. Herein, the proximity level display refers to an interface configured to aid (or help) the user to acknowledge whether a distance between the virtual object 700 and the input object 710 is becoming shorter or closer (i.e., whether the input object 710 is becoming closer to the virtual object 700 or whether the input object 710 is moving further away from the virtual object 700), and to acknowledge how close the input object 710 is to the virtual object 700, if it is recognized that the input object 710 is becoming closer to the virtual object 700. When it is determined that the user intends to select the virtual object 700, the processor 110 may control the interface that displays the level of proximity between the input object 710 and the virtual object 700. Referring to (d) of FIG. 8, it is illustrated that the input object 710 is becoming closer to the virtual object 700 from reference numeral 710-1 to reference numeral 710-3. At this point, it is shown in the drawing that a circle 714, which is configured to indicate the level of proximity between the input object 710 and the virtual object 700, becomes gradually smaller from reference numeral 714-1 to reference numeral 714-3.

Meanwhile, although it is not disclosed in this specification, it will be apparent to anyone having general knowledge and being skilled in the art that a guide interface can be selected or added.

Meanwhile, in case the location of the input object is near the virtual object, and when the calculated input object movement speed is greater than the predetermined reference speed, the processor 110 may move (or relocate) the position of the virtual object, so that the virtual object can have a depth greater than the location of the input object.

FIG. 9 illustrates an example of displaying a guide interface, when the movement speed of an input object is high when located near a virtual object.

Referring to (a) of FIG. 9, an input object 910 that is about to select a virtual object 900 is illustrated. As shown in the exemplary embodiment of (a) of FIG. 9, the input object 910 corresponds to the user's finger. Meanwhile, in (a) of FIG. 9, as described-above with reference to FIG. 7, a section that is not located near the virtual object 900 is indicated as 'Section number 1', and a section that is located near the virtual object 900 is indicated as 'Section number 2'.

However, the situation illustrated in (a) of FIG. 9 corresponds to a situation wherein the user has incorrectly recognized the depth of the virtual object 900 and has quickly moved the input object 910. More specifically, in comparison with FIG. 7, the user has mistaken the virtual object 900 to have a depth greater than the actual depth at which the virtual object 900 is located. As a result, the input object 910 instead of slowing down the movement speed of the input object 910, the input object 910 quickly moves past Section number 2, which is near the virtual object 900. Accordingly, when a location of the input object is near the virtual object, and when the calculated input object movement speed is higher than the predetermined reference speed, the processor 110 may determine that the user has mistaken the depth at which the virtual object is actually located. Therefore, as shown in (b) of FIG. 9, the processor 110 may relocate the location of the virtual object 900 so that the virtual object 900 can have a greater depth (location of reference numeral 900-1) than the location of the input object 910.

Meanwhile, when a location of the input object is near the virtual object, and when the calculated input object movement speed is higher than the predetermined reference speed, the processor 110 may increase an area of the second scope of accreditation.

Figure 10:
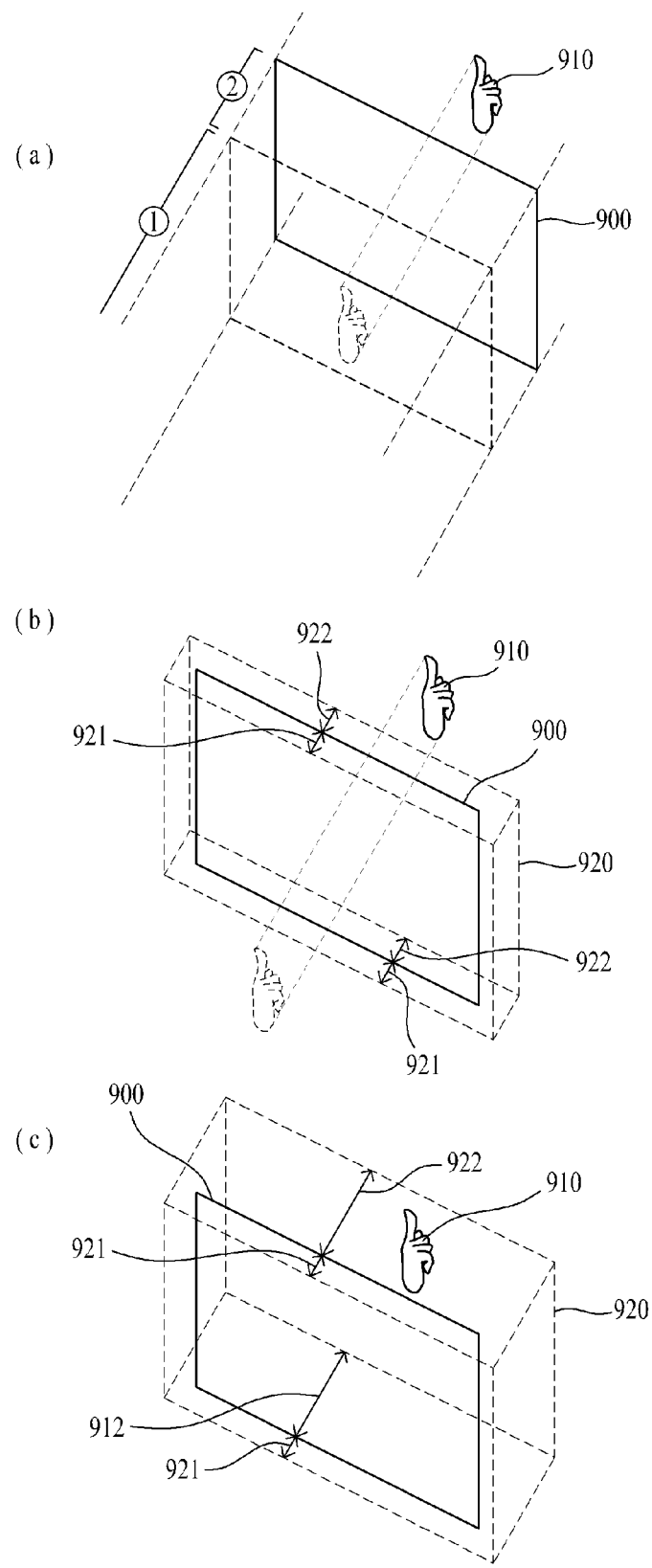
FIG. 10 illustrates an example of increasing an area of the second scope of accreditation, when the movement speed of an input object is high when located near a virtual object.

FIG. 10 illustrates an example of increasing an area of the second scope of accreditation, when the movement speed of an input object is high when located near a virtual object.

Referring to (a) of FIG. 10, as described above with reference to (a) of FIG. 9, a situation wherein the user has incorrectly recognized the depth of the virtual object 900 and has quickly moved the input object 910 is illustrated.

Referring to (b) of FIG. 10, the scope of accreditation 920 of the virtual object 900 in the situation corresponding to (a) of FIG. 10 will be described in detail. The scope of accreditation 920 includes a first scope of accreditation 921 and a second scope of accreditation 922. Since the first scope of accreditation 921 and the second scope of accreditation 922 have already been described above, detailed description of the same will be omitted for simplicity. The input object 910 may slide past the depth of the virtual object 900 and may continue to slide past the second scope of accreditation 922. In this case, the processor 110 may increase the thickness of the second scope of accreditation 922.

Referring to (c) of FIG. 10, the second scope of accreditation 922 is increased. In this case, when the input object 910 is located within the second scope of accreditation, the processor 110 may determine that the input object 910 has selected the virtual object 900. Conversely, even if the input object 910 is not located within the second scope of accreditation, the user may select the virtual object 900 by slightly moving (or relocating) the input object 910 towards the virtual object 900.

According to this specification, an area of the scope of accreditation may be configured to be in cooperation with a depth of the virtual object and a size of the virtual object. According to an exemplary embodiment, the area of the scope of accreditation may become larger as a size of the virtual object becomes smaller than a predetermined reference size of the virtual object.

Figure 11:
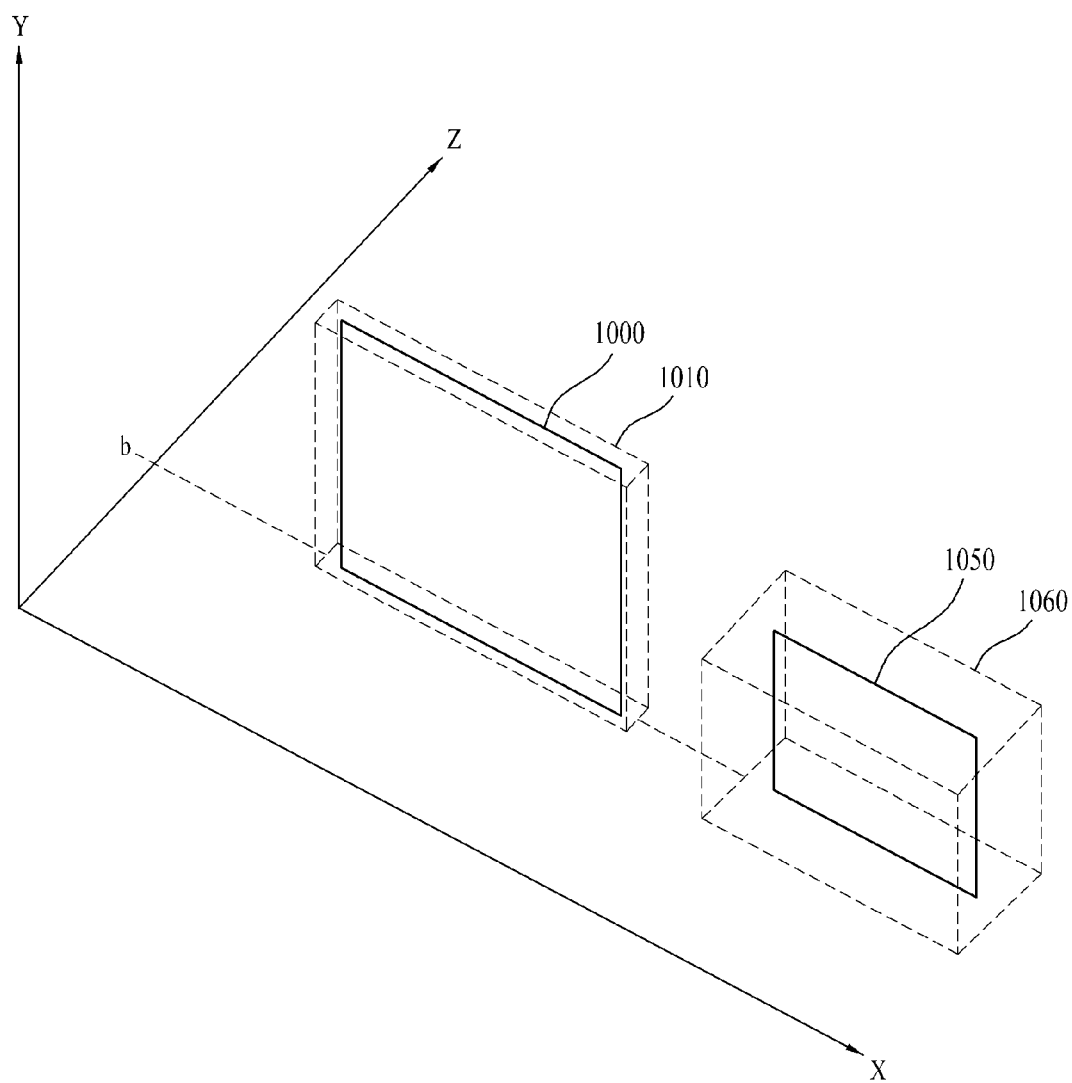
FIG. 11 illustrates an example of the area of the scope of accreditation becoming larger as the size of the virtual object becomes smaller than a predetermined reference size of the virtual object.

FIG. 11 illustrates an example of the area of the scope of accreditation becoming larger as the size of the virtual object becomes smaller than a predetermined reference size of the virtual object.

Referring to FIG. 11, two virtual objects 1000 and 1050 each having the same depth 'b' are illustrated. Herein, it will be apparent that each of the two virtual objects 1000 and 1050 has a different size. At this point, the virtual object assigned with reference numeral 1000 becomes the virtual object having the reference size. And, the virtual object assigned with reference numeral 1050 is smaller than the reference size. The reference size of the virtual object may be diversely predetermined based upon contents of information, amount (or size) of information, user convenience, and so on.

Meanwhile, when the size of the virtual object is smaller than the reference size, the area of the scope of accreditation may also become small. Accordingly, the scope of accreditation may become larger so that the user can more easily select a virtual object having a size smaller than the reference size.

In the exemplary embodiment shown in FIG. 11, although the first scope of accreditation and the second scope of accreditation are not illustrated, an exemplary embodiment of the scope of accreditation being configured in accordance with the size of the virtual object may be considered along with a variety of the above-described exemplary embodiments. Additionally, although an exemplary embodiment of a virtual object having a size smaller than the reference size is only illustrated in FIG. 11, the illustrated exemplary embodiment will not limit the scope of accreditation of a virtual object having a size larger than the reference size. The scope of accreditation of a virtual object having a size larger than the reference size may also be configured to be in cooperation with a depth of the virtual object and a size of the virtual object.

Hereinafter, a controlling method for controlling the above-described display device 100 will be described in detail. However, in describing the method for controlling the display device 100, since the configuration and functions of the display device 100 have already been described above, detailed description of the same will be omitted for simplicity.

Figure 12:
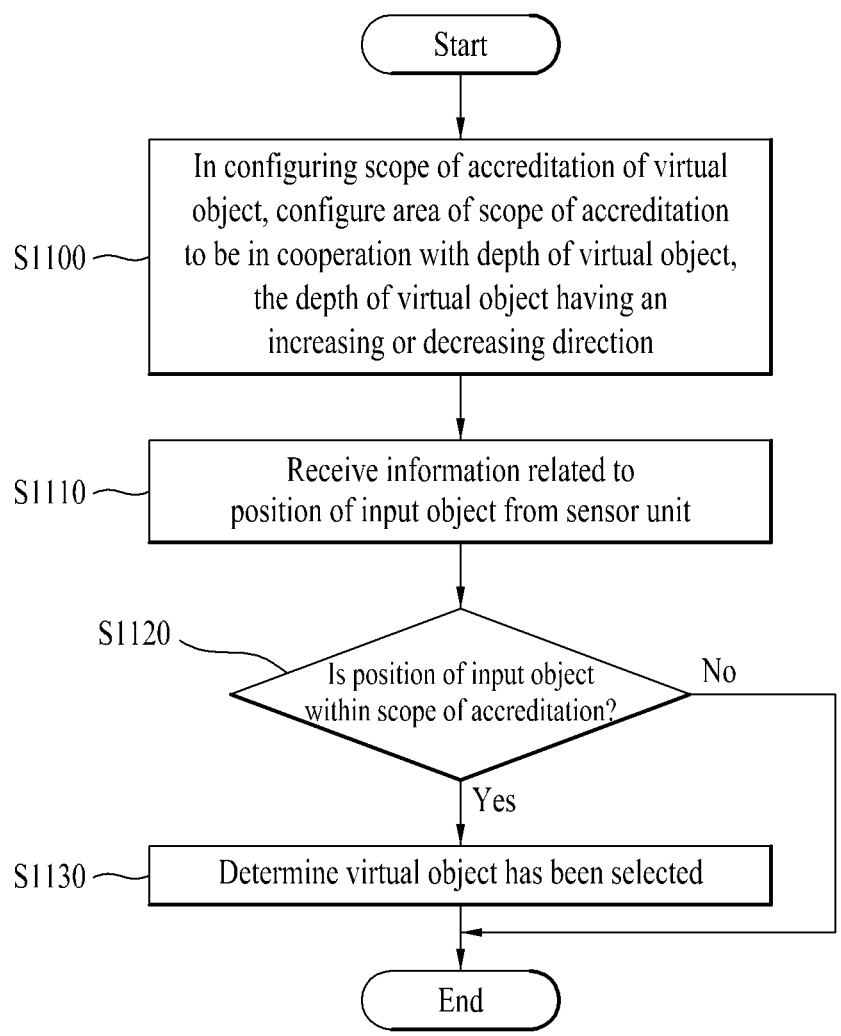
FIG. 12 illustrates a flow chart showing a general flow of the method for controlling the display device according to an exemplary embodiment of this specification.

FIG. 12 illustrates a flow chart showing a general flow of the method for controlling the display device according to an exemplary embodiment of this specification.

Referring to FIG. 12, first of all, in step S1100, in configuring the scope of accreditation of a virtual object, the processor 110 may configure the scope of accreditation having an increasing or decreasing direction of the depth of the virtual object to be in cooperation with a depth at which the virtual object is located. The processor 110 ends step S1100 and moves on to step S1110.

According to an exemplary embodiment of this specification, the area of the scope of accreditation may be configured to become larger as the size of a depth at which the virtual object is located becomes smaller. Since this exemplary embodiment has already been described with reference to FIG. 4, detailed description of the same will be omitted for simplicity.

According to another exemplary embodiment of this specification, the area of the scope of accreditation may be configured to become larger as the size of a depth at which the virtual object is located becomes larger. Since this exemplary embodiment has already been described with reference to FIG. 5, detailed description of the same will be omitted for simplicity.

According to yet another exemplary embodiment of this specification, if a depth at which the virtual object is located is smaller than a reference depth, the area of the scope of accreditation may be configured to become larger, and, if a depth at which the virtual object is located is larger than a reference depth, the area of the scope of accreditation may be configured to become larger. Since this exemplary embodiment has already been described with reference to FIG. 6, detailed description of the same will be omitted for simplicity.

Meanwhile, the scope of accreditation may include a first scope of accreditation being located along a decreasing direction of the depth with respect to the virtual object and a second scope of accreditation being located along an increasing direction of the depth with respect to the virtual object. Additionally, the first scope of accreditation and the second scope of accreditation may be configured to be in cooperation with the depth where the virtual object is located.

According to an exemplary embodiment of this specification, an area of the second scope of accreditation may be configured to be larger than an area of the first scope of accreditation as the size of the depth where the virtual object is located becomes smaller. Since this exemplary embodiment has already been described with reference to FIG. 4, detailed description of the same will be omitted for simplicity.

According to another exemplary embodiment of this specification, an area of the first scope of accreditation may be configured to be larger than an area of the second scope of accreditation as the size of the depth where the virtual object is located becomes larger. Since this exemplary embodiment has already been described with reference to FIG. 5, detailed description of the same will be omitted for simplicity.

According to yet another exemplary embodiment of this specification, if the size of the depth where the virtual object is located is smaller than the reference depth, an area of the second scope of accreditation may be configured to be larger than an area of the first scope of accreditation, and, if the size of the depth where the virtual object is located is larger than the reference depth, an area of the first scope of accreditation may be configured to be larger than an area of the second scope of accreditation. Since this exemplary embodiment has already been described with reference to FIG. 6, detailed description of the same will be omitted for simplicity.

According to this specification, an area of the scope of accreditation may be configured to be in cooperation with a depth of the virtual object and a size of the virtual object. According to an exemplary embodiment, the area of the scope of accreditation may become larger as a size of the virtual object becomes smaller than a predetermined reference size of the virtual object. Since this exemplary embodiment has already been described with reference to FIG. 11, detailed description of the same will be omitted for simplicity.

In step S1110, the processor 110 may receive information on a location of an input object from a sensor unit. The processor 110 ends step S1110 and moves on to step S1120.

In step 1120, the processor 110 may determine whether or not a location of the input object is within the scope of accreditation. If it is determined that the location of the input object is within the scope of accreditation (YES of S1120), the processor 110 moves on to step S1130. Conversely, if it is determined that the location of the input object is not within the scope of accreditation (NO of S1120), the processor 110 ends the control process.

In step S1130, the processor 110 may determine that the virtual object has been selected. Thereafter, the processor 110 ends the control process.

However, in this specification, the ending of the processor 110 only indicates that a series of process steps related to whether or not the virtual object has been selected. And, therefore, the ending of the processor 110 does not signify that all control functions of the display device is ended.

Figure 13:
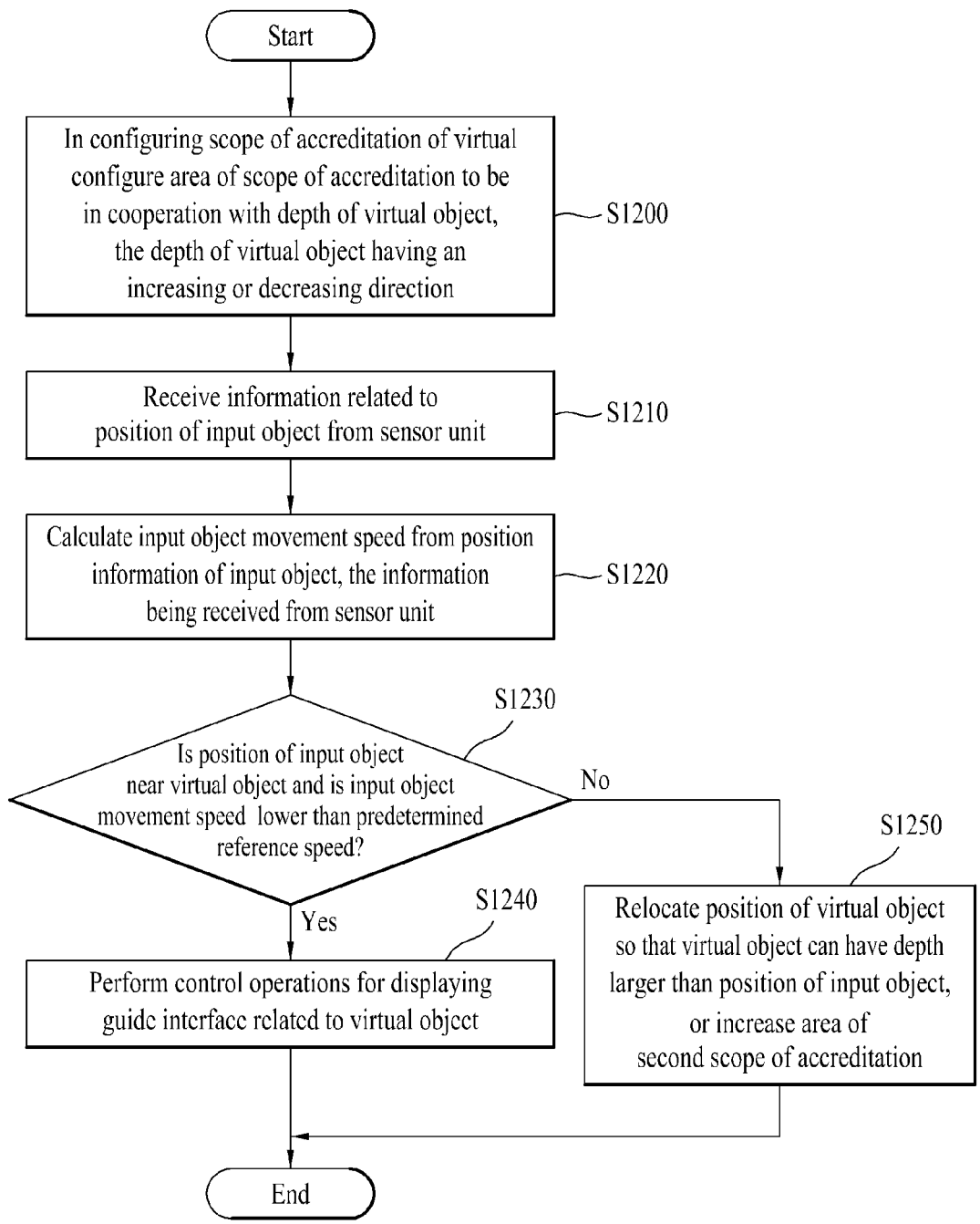
FIG. 13 illustrates a flow chart showing a general flow of the method for controlling the display device according to another exemplary embodiment of this specification.

FIG. 13 illustrates a flow chart showing a general flow of the method for controlling the display device according to another exemplary embodiment of this specification.

Referring to FIG. 13, first of all, in step S1200, in configuring the scope of accreditation of a virtual object, the processor 110 may configure the scope of accreditation having an increasing or decreasing direction of the depth of the virtual object to be in cooperation with a depth at which the virtual object is located. The processor 110 ends step S1200 and moves on to step S1210.

In step S1210, the processor 110 may receive information on a location of an input object from a sensor unit. The processor 110 ends step S1210 and moves on to step S1220.

In step S1220, the processor 110 may calculate an input object movement speed from position information of the input object received from the sensor unit. The processor 110 ends step S1220 and moves on to step S1230.

In step S1230, the processor 110 may determine whether or not a location of the input object is close to the virtual object and whether or not the calculated input object movement speed is lower than a predetermined reference speed.

When the location of the input object is near the virtual object, and when the calculated input object movement speed is lower than the predetermined reference speed (YES of S1230), the processor 110 moves on to step S1240. Conversely, when the location of the input object is not near the virtual object, or when the calculated input object movement speed is not lower than the predetermined reference speed (NO of S1230), the processor 110 moves on to step S1250.

In step S1240, the processor 110 may perform control operations so that a guide interface related to the virtual object can be displayed. Thereafter, the processor 110 ends the process.

According to an exemplary embodiment of this specification, the guide interface may correspond to a shadow of an input object. And, since this exemplary embodiment has already been described with reference to (a) of FIG. 8, detailed description of the same will be omitted for simplicity.

According to another exemplary embodiment of this specification, the guide interface may correspond to a shadow of a virtual object. And, since this exemplary embodiment has already been described with reference to (b) of FIG. 8, detailed description of the same will be omitted for simplicity.

According to yet another exemplary embodiment of this specification, the guide interface may correspond to bouncing (or a bouncing movement) of a virtual object. And, since this exemplary embodiment has already been described with reference to (c) of FIG. 8, detailed description of the same will be omitted for simplicity.

According to yet another exemplary embodiment of this specification, the guide interface may correspond to a display of a proximity level between the input object and the virtual object. And, since this exemplary embodiment has already been described with reference to (d) of FIG. 8, detailed description of the same will be omitted for simplicity.

Meanwhile, in step S1250, the processor 110 may relocate the location of the virtual object, so that the virtual object can have a greater depth than the location of the input object, or the processor 110 may increase the area of the second scope of accreditation. Since step S1250 has already been described with reference to FIG. 9 and FIG. 10, detailed description of the same will be omitted for simplicity. Thereafter, the processor 110 ends the process.

However, in this specification, the ending of the processor 110 only indicates that a series of process steps related to whether or not the virtual object has been selected. And, therefore, the ending of the processor 110 does not signify that all control functions of the display device is ended.

As described above, the display device having a scope of accreditation in cooperation with a depth of a virtual object and a controlling method thereof have the following advantages. According to an aspect of this specification, in selecting a virtual object being provided in a 3D image, the likelihood of the user mistaking the depth of a virtual image and failing to select the corresponding virtual image is reduced.

According to another aspect of this specification, by providing a guide interface that can help the user, when the user seeks to select a virtual object by using an input object movement speed, the user may be capable of selecting the virtual object with more accuracy. And, according to yet another aspect of this specification, even if the user has mistaken the depth of a virtual object by using the input object movement speed, this specification provides help allowing the user to accurately select the wanted virtual object.

In this description, although terms such as "first and/or second" may be used to describe diverse elements of this specification, it should be understood that the elements included in this specification will not be limited only to the terms used herein. The above-mentioned terms will only be used for the purpose of differentiating one element from another element, for example, without deviating from the scope of this specification, a first element may be referred to as a second element, and, similarly, a second element may also be referred to as a first element.

Moreover, throughout the entire description, when one part is said to "include (or comprise)" an element, unless specifically mentioned otherwise, instead of excluding any other element, this may signify that the one part may further include other elements. Furthermore, the term "unit (or part)", which is mentioned in the description of this specification, refers to a unit for processing at least one function or operation, and this may be realized in the form of hardware, software, or in a combination of both hardware and software.

This specification has been presented as described above according to the detailed and exemplary embodiments, and, therefore, it should be understood that all variations and modifications, equivalents, and replacements, which are included in the technical scope and spirit of this specification, can be made by anyone skilled in the art. Therefore, it should also be understood that the scope and spirit of this specification includes details that can be easily deduced and estimated by anyone skilled in the art based upon the detailed description and exemplary embodiments set forth herein.

Additionally, although this specification has been described in detail based upon an example of having only one subsidiary element added for simplicity, embodiments having two or more subsidiary elements further added to the display device may also be realized. Therefore, the exemplary disclosed herein will not limit the scope of this specification.

It will be apparent to those skilled in the art that various modifications and variations can be made in this specification without departing from the spirit or scope of the inventions. Thus, it is intended that this specification covers the modifications and variations of this invention provided they come within the scope of the appended claims and their equivalents.

What is claimed is:

1. A display device, comprising:
   a processor configured to control operations of the display device;
   a display unit configured to output a three-dimensional (3D) image including one or more virtual objects based on a command from the processor; and
   a sensor unit configured to sense a position of an input object selecting the one or more virtual objects and to deliver information of the sensed result to the processor,
   wherein the processor is further configured to determine that a virtual object has been selected, when a position of the input object is located within a scope of accreditation, the scope of accreditation being a scope accrediting that the virtual object has been selected,
   wherein an area of the scope of accreditation is configured to be in cooperation with a depth of the virtual object along an increasing or a decreasing direction of the depth of the virtual object,
   wherein the depth of the virtual object indicates a distance level between the virtual object and a user's perspective within the 3D image, and
   wherein the area of the scope of accreditation becomes larger as the depth of the virtual object becomes smaller.

2. The device of claim 1, wherein the area of the scope of accreditation becomes larger, when the depth of the virtual object is smaller than a reference depth, and
   wherein the area of the scope of accreditation becomes larger, when the depth of the virtual object is larger than the reference depth.

3. The device of claim 2, wherein the reference depth is configured to have a consistent range.

4. The device of claim 2, wherein the reference depth is predetermined.

5. The device of claim 2, wherein the reference depth is configured by the user.

6. The device of claim 5, wherein the processor is further configured to provide an interface for configuring the reference depth to the display unit.

7. The device of claim 1, wherein the scope of accreditation comprises a first scope of accreditation located along the decreasing direction of the depth with respect to the virtual object, and a second scope of accreditation located along the increasing direction of the depth with respect to the virtual object, and
   wherein the first scope of accreditation and the second scope of accreditation are configured to be in cooperation with the depth of the virtual object.

8. The device of claim 7, wherein an area of the second scope of accreditation is larger than an area of the first scope of accreditation, as the depth of the virtual object becomes smaller.

9. The device of claim 7, wherein an area of the second scope of accreditation is larger than an area of the first scope of accreditation, as the depth of the virtual object becomes larger.

10. The device of claim 7, wherein an area of the second scope of accreditation is larger than an area of the first scope of accreditation, when the depth of the virtual object is smaller than a reference depth, and
    wherein an area of the first scope of accreditation is larger than an area of the second scope of accreditation, when the depth of the virtual object is larger than a reference depth.

11. The device of claim 1, wherein the processor is further configured to calculate an input object movement speed from position information of the input object, and
    wherein the position information of the input object is received from the sensor unit.

12. The device of claim 11, wherein the processor is further configured to perform control operations for displaying a guide interface related to the virtual object, when a position of the input object is near the virtual object, and when the calculated input object movement speed is lower than a predetermined reference speed.

13. The device of claim 12, wherein the guide interface corresponds to one of a shadow of an input object, a shadow of a virtual object, a bouncing movement of a virtual object, and a display of a proximity level between an input object and a virtual object.

14. The device of claim 11, wherein the processor is further configured to relocate a position of the virtual object so as to provide a larger depth to the virtual object as compared to a position of the input object, when the position of the input object is near the virtual object, and when the calculated input object movement speed is higher than a predetermined reference speed.

15. The device of claim 11, wherein the scope of accreditation comprises a first scope of accreditation located along the decreasing direction of the depth with respect to the virtual object, and a second scope of accreditation located along the increasing direction of the depth with respect to the virtual object, and
    wherein the processor is further configured to increase an area of the second scope of accreditation, when the position of the input object is near the virtual object, and when the calculated input object movement speed is higher than a predetermined reference speed.

16. The device of claim 1, wherein the scope of accreditation is configured to be in cooperation with the depth of the virtual object and a size of the virtual object.

17. The device of claim 16, wherein an area of the scope of accreditation becomes larger as a size of the virtual object becomes smaller than a predetermined reference size of the virtual object.

18. A method of controlling a display device comprising a display unit configured to output a three-dimensional (3D) image including one or more virtual objects, and a processor, the method comprising:
    configuring an area of a scope of accreditation to be in cooperation with a depth of a virtual object along an increasing or a decreasing direction of the depth of the virtual object, wherein the depth of the virtual object indicates a distance level between the virtual object and a user's perspective within the 3D image;
    receiving information related to a position of the input object from a sensor unit; and
    determining that a virtual object has been selected, when a position of the input object is located within a scope accrediting that the virtual object has been selected,
    wherein the area of the scope of accreditation becomes larger as the depth of the virtual object becomes smaller.

* * * * *